United States Patent
Hekele et al.

(10) Patent No.: US 7,274,024 B2
(45) Date of Patent: Sep. 25, 2007

(54) RADIATION DETECTOR

(75) Inventors: Wilhelm Hekele, Eggstaett (DE); Thomas Hilderscheid, Altdorf (DE); Juergen Leppert, Forchheim (DE); Helmut Winkelmann, Eggolsheim (DE); Sebastian Wolf, Forchheim-Kersbach (DE)

(73) Assignee: Siemens Aktiengesellschaft, Munich (DE)

( * ) Notice: Subject to any disclaimer, the term of this patent is extended or adjusted under 35 U.S.C. 154(b) by 98 days.

(21) Appl. No.: 11/296,472

(22) Filed: Dec. 8, 2005

(65) Prior Publication Data

US 2006/0131502 A1 Jun. 22, 2006

(30) Foreign Application Priority Data

Dec. 9, 2004 (DE) .................. 10 2004 059 434

(51) Int. Cl.
*G01T 1/20* (2006.01)
(52) U.S. Cl. .................. 250/368; 250/370.11
(58) Field of Classification Search ........... 250/368
See application file for complete search history.

(56) References Cited

U.S. PATENT DOCUMENTS

2002/0056811 A1* 5/2002 Otto .................. 250/370.11

2003/0236388 A1 12/2003 Armstrong et al.

FOREIGN PATENT DOCUMENTS

DE 103 26 290 A1 3/2005

OTHER PUBLICATIONS

German Office Action.

* cited by examiner

*Primary Examiner*—David Porta
*Assistant Examiner*—Marcus H Taningco
(74) *Attorney, Agent, or Firm*—Harness, Dickey & Pierce, P.L.C.

(57) ABSTRACT

A radiation detector is disclosed for the detection of ionizing radiation, preferably in a medical diagnosis and/or therapy system, having at least one detector element which is at least partially enclosed by an encapsulation compound. The encapsulation compound at least partially reflects light which is produced during the absorption of the ionizing radiation in the at least one detector element. Further, the detection of the radiation is carried out indirectly by detection of the generated light, wherein the encapsulation compound is made of a multicomponent mixture which converts compounds produced because of radiation, which generate color changes of the encapsulation compound, at least partially into colorless nonabsorbing compounds.

24 Claims, 1 Drawing Sheet

RADIATION DETECTOR

The present application hereby claims priority under 35 U.S.C. §119 on German patent application number DE 10 2004 059 434.1 filed Dec. 9, 2004, the entire contents of which is hereby incorporated herein by reference.

FIELD

The invention generally relates to a radiation detector for the detection of ionizing radiation, for example, in a medical diagnosis and/or therapy system. The detector may include at least one detector element which is at least partially enclosed by an encapsulation compound, the encapsulation compound at least partially reflecting light which is produced during the absorption of the ionizing radiation in the at least one detector element, and the detection of the radiation being carried out indirectly by detection of the generated light.

BACKGROUND

Radiation detectors for the detection of ionizing radiation are widely known. Especially in the field of medical diagnosis, radiation detectors are used which have a high spatial resolution, and to this end are composed of a multiplicity of individual detector elements. These detector elements are usually elements made of scintillator ceramic, which are arranged flat and together provide a multiline detector.

In order to fix the arrangement of the individual detector elements, the matrix of individual detector elements is encapsulated in an encapsulation compound. The purpose of this encapsulation compound is not only to fix the individual detector elements, however, but the encapsulation compound also ensures reflection of the photons produced by the ionizing radiation in the scintillator ceramic. Epoxy resin systems, for example UHU Plus or Araldite, respectively filled with titanium dioxide, are used as the encapsulation compound.

Epoxy resin systems generally consist of two reactive components. On the one hand, they generally include the epoxy resin with the ethylene oxide ring (epoxide group) as a functional group and, on the other hand, they generally include an aminic curing agent whose functional group is aminohydrogen. The reaction of the epoxide group and the curing component takes place in the form of polyaddition. No byproducts are eliminated in this case. In general, stoichiometric crosslinking is achieved when the molar ratio ensures that one epoxide group reacts with one aminohydrogen.

The functionality of the epoxy resin is described by the epoxide equivalent parameter (g/eq), and that of the curing agent is described by the H equivalent index (g/eq). The amount of curing agent which is needed for 100 g of epoxy resin is normally worked out as follows:

$$\frac{H \text{ equivalent}}{\text{epoxide equivalent}} \times 100 = \frac{\text{mass of curing agent}}{100 \text{ g of resin}}$$

The following procedure is to be adopted in order to calculate the mixing ratio of different resins with a curing component:

$$\frac{H \text{ equivalent}}{\text{epoxide equivalent 1}} \times wt. \% \ 1 + \frac{H \text{ equivalent}}{\text{epoxide equivalent 2}} \times wt. \% \ 2 = \frac{\text{mass of curing agent}}{100 \text{ g of resin}}$$

The H equivalent of mixtures of different resins can be calculated using the following formula:

$$\frac{\text{total mass of mixture}}{\frac{\text{mass of curing agent 1}}{H \text{ equivalent 1}} + \frac{\text{mass of curing agent 2}}{H \text{ equivalent 2}} + \ldots} = H \text{ equivalent of curing agent mixture}$$

When such known epoxy resin systems are used, the problem arises that the encapsulation compound discolors over time because of the irradiation. The effect of this discoloration is that light produced in the scintillator ceramic is no longer fully reflected, but partly absorbed. The luminous efficiency of a detector element therefore decreases with progressive irradiation. Typical values of the reduction in the luminous efficiency are of the order of 30% after 30 kGy of irradiation.

SUMMARY

It is therefore an object of at least one embodiment of the invention to provide an encapsulation compound for detector elements, which has an improved radiation resistance.

The inventors have found that it is possible, in at least one embodiment, to provide an encapsulation compound which experiences little or no modifications due to X-radiation, if compounds produced because of radiation are converted into colorless nonabsorbing compounds.

The inventors therefore propose, in at least one embodiment, that a radiation detector for the detection of ionizing radiation, for example in a medical diagnosis and/or therapy system, include at least one detector element which is at least partially enclosed by an encapsulation compound, the encapsulation compound at least partially reflecting light which is produced during the absorption of the ionizing radiation in the at least one detector element, and the detection of the radiation being carried out indirectly by detection of the generated light. Further, the encapsulation compound is made from a multicomponent mixture which converts compounds produced because of radiation, which generate color changes of the encapsulation compound, at least partially into colorless nonabsorbing compounds.

One effect of this measure of at least one embodiment is to maintain the reflectivity of the encapsulation compound, so that the luminous efficiency of the detector element in question is also at least substantially preserved.

According to at least one embodiment of the invention, the encapsulation compound may be made at least of the following constituents: a binder, preferably a resin component, a curing agent and a filler.

One of the following substances or a mixture of an arbitrary combination of at least two of the following substances may be used as the binder: bisphenol A epoxy resin (oligomer of bisphenol A), bisphenol F epoxy resin (oligomer of bisphenol F), cycloaliphatic epoxy resins.

An aromatic-free acid anhydride, preferably methyl hexahydrophthalic acid, preferably hexahydrophthalic acid anhydride and/or a derivative of hexahydrophthalic acid anhydride, may be used as the curing agent. Titanium dioxide may furthermore be used as the preferred filler.

At least one reactive diluent, preferably with an aliphatic or cycloaliphatic base structure, may also be added to the encapsulation compound. In particular, polypropylene glycol diglycidyl ether is suitable for this. A catalyst, preferably phosphonium compounds, may furthermore be added in order to improve the binding.

Specifically, the encapsulation compound may be composed of a binder having 50-100% by weight of bisphenol A diglycidyl ether and 0-50% by weight of reactive diluent, preferably polypropylene glycol diglycidyl ether, and the reactively necessary curing agent component.

The radiation detector may be configured so that the at least one detector element is covered with encapsulation compound on the side facing the radiation. In a manner which is known per se, the radiation detector may also be constructed from a multiplicity of detector elements arranged flat, and the intermediate spaces between the detector elements may be at least partially filled with the encapsulation compound according to at least one embodiment of the invention.

BRIEF DESCRIPTION OF THE DRAWINGS

Additional features and advantages of the invention can be found in the following description of an example embodiment with reference to the drawings, only the features necessary for understanding the invention being represented here.

The invention will be explained in more detail below with the aid of the appended drawings, in which the following references are used: 1: detector; 2: focus; 3: radiation cone; 4: detector element; 5: encapsulation compound; 6: cover layer.

DETAILED DESCRIPTION OF THE EXAMPLE EMBODIMENTS

Figure 1:
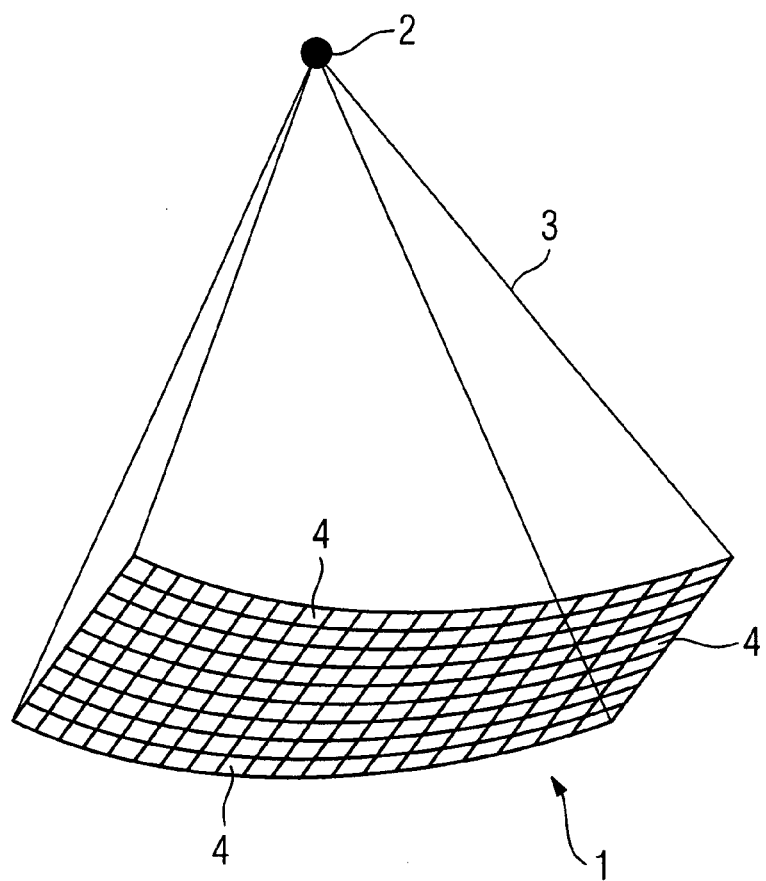
FIG. 1 shows a schematic representation of a multiline detector with the focus of an X-ray tube and a radiation cone.

FIG. 1 represents very schematically a focus/detector system having a detector 1 according to at least one embodiment of the invention, which includes a multiplicity of individual detector elements 4. The detector is irradiated from the focus 2 by a radiation cone 3 from above.

Figure 2:
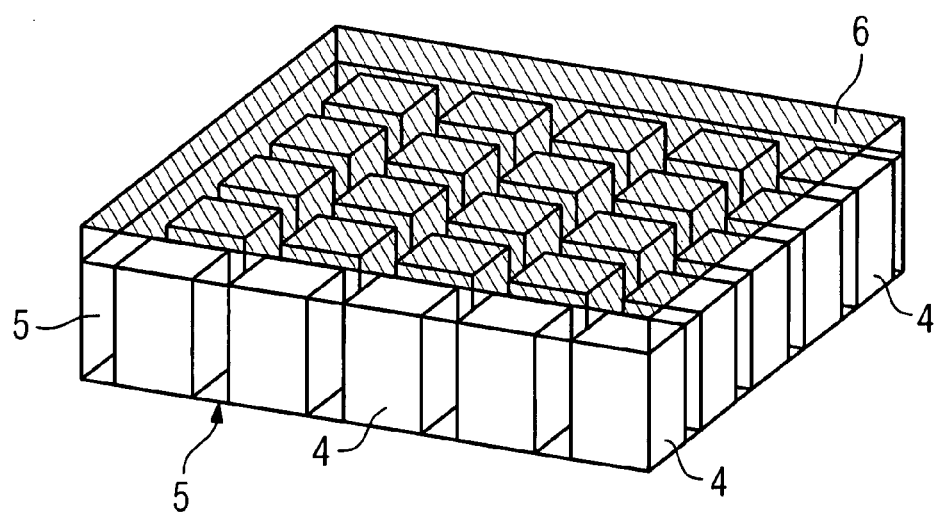
FIG. 2 shows a detail of the radiation detector with encapsulated detector elements.

FIG. 2 shows a detail of such a radiation detector, in which the spatial structure of the detector can be seen more clearly. This detail shows 25 individual detector elements 4, which are arranged in a checkerboard pattern and with intermediate spaces. The intermediate spaces contain the encapsulation compound 5 according to at least one embodiment of the invention, so that light generated in the detector elements, which consist of a scintillator ceramic material, is reflected back from the walls and is therefore available for the measurement. There is also a layer 6 of encapsulation compound above the detector elements 4, which covers the detector elements 4 in the radiation direction.

In a specific embodiment of the encapsulation compound, the binder used is composed of a bisphenol A diglycidyl ether oligomer and the reactive diluent. Both have epoxide groups as reactive groups. The reaction equivalent is calculated from the molar mass/number of reactive groups, given in 168 g/equivalent.

Methyl hexahydrophthalic acid anhydride with a molar weight of 168 g/mole is used as the curing agent. An anhydride group reacts with an epoxide group, and thus has a reaction equivalent of 168 g/equivalent. One curing agent equivalent always reacts with one binder equivalent. The ratio of the two binder components determines the mechanical and thermal properties, for example the glass transition point of the encapsulation compound. The following formulation is thus obtained:

Binder:
Component A:
90% by weight of bisphenol A diglycidyl ether/370 g/mol
Component B:
10% by weight of reactive diluent/500 g/mol
→ molar equivalent of A: 185 g
  molar equivalent of B: 250 g
A: 90 g-0.54 equivalent
B: 10 g-0.04 equivalent
→100 g-0.58 equivalent Curing agent component=168 g/equivalent*0.58 equivalent=97.44 g The mixing ratio is therefore given as:

$$A + B = 100.00 \text{ g binder} + 97.44 \text{ g curing agent.}$$

The chemical formulae for substances mentioned as examples will be given for completeness:

Bisphenol A diglycidyl ether oligomer:

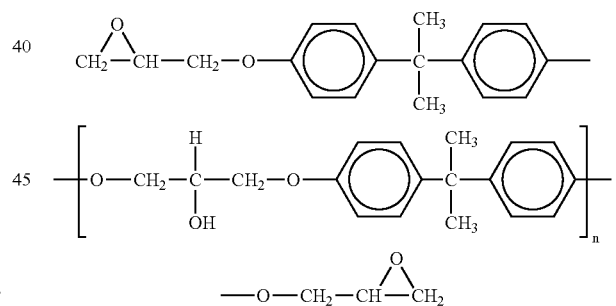

with n=0 to 3, preferably n=0.1 to 1, n being the average molar mass distribution of the oligomers.

Methyl Hexahydrophthalic Acid:

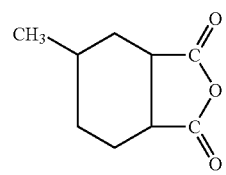

It is to be understood that the aforementioned features of embodiments of the invention may be used not only in the combination respectively indicated, but also in other combinations or separately, without departing from the scope of the invention.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A radiation detector for the detection of ionizing radiation, comprising:
   at least one detector element, at least partially enclosed by an encapsulation compound, the encapsulation compound at least partially reflecting light produced during absorption of ionizing radiation in the at least one detector element, and the detection of the ionizing radiation being carried out indirectly by detection of the generated light, the encapsulation compound being made of a multicomponent mixture which converts compounds produced because of radiation, which generate color changes of the encapsulation compound, at least partially into colorless nonabsorbing compounds.

2. The radiation detector as claimed in claim 1, wherein the encapsulation compound is made at least of the following constituents:
   a binder, preferably a resin component;
   a curing agent;
   a filler.

3. The radiation detector as claimed in claim 2, wherein at least one of one of the following substances and a mixture of an arbitrary combination of at least two of the following substances is used as the binder: oligomer of bisphenol A diglycidyl ether, oligomer of bisphenol F diglycidyl ether.

4. The radiation detector as claimed in claim 2, wherein an aromatic-free acid anhydride is used as the curing agent.

5. The radiation detector as claimed in claim 4, wherein methyl hexahydrophthalic acid is used as the curing agent.

6. The radiation detector as claimed in claim 1, wherein at least one of one of the following substances and a mixture of an arbitrary combination of at least two of the following substances is used as the binder: oligomer of bisphenol A diglycidyl ether, oligomer of bisphenol F diglycidyl ether.

7. The radiation detector as claimed in claim 6, wherein an aromatic-free acid anhydride is used as the curing agent.

8. The radiation detector as claimed in claim 7, wherein methyl hexahydrophthalic acid is used as the curing agent.

9. The radiation detector as claimed in claim 1, wherein an aromatic-free acid anhydride is used as the curing agent.

10. The radiation detector as claimed in claim 9, wherein methyl hexahydrophthalic acid is used as the curing agent.

11. The radiation detector as claimed in claim 10, wherein at least one of hexahydrophthalic acid anhydride and a derivative of hexahydrophthalic acid anhydride is used as the curing agent.

12. The radiation detector as claimed in claim 1, wherein titanium dioxide is used as the filler.

13. The radiation detector as claimed in claim 1, wherein at least one reactive diluent is added to the encapsulation compound.

14. The radiation detector as claimed in claim 13, wherein polypropylene glycol diglycidyl ether is used as the reactive diluent.

15. The radiation detector as claimed in claim 1, wherein at least one catalyst is added to the encapsulation compound.

16. The radiation detector as claimed in claim 1, wherein the encapsulation compound is composed of a binder having 50-100% by weight of bisphenol A diglycidyl ether and 0-50% by weight of reactive diluent, preferably polypropylene glycol diglycidyl ether, and the reactively necessary curing agent component.

17. The radiation detector as claimed in claim 1, wherein the at least one detector element is covered with a cover layer of encapsulation compound on the side facing the radiation.

18. The radiation detector as claimed in claim 1, wherein the radiation detector is constructed from a multiplicity of detector elements arranged flat, and intermediate spaces between the detector elements are at least partially filled with the encapsulation compound.

19. The radiation detector as claimed in claim 1, wherein the radiation detector is for the detection of ionizing radiation in at least one of a medical diagnosis and therapy system.

20. A medical diagnosis system comprising the radiation detector as claimed in claim 1.

21. A therapy system comprising the radiation detector as claimed in claim 1.

22. The radiation detector as claimed in claim 1, wherein at least one reactive diluent with an aliphatic base structure is added to the encapsulation compound.

23. The radiation detector as claimed in claim 1, wherein phosphonium compounds is added to the encapsulation compound.

24. A method for detection of ionizing radiation, comprising:
   at least partially reflecting light, via an encapsulation compound at least partially enclosing detector element, produced during absorption of ionizing radiation in at least one detector element; and
   detecting ionizing radiation indirectly by detecting generated light, wherein the encapsulation compound is made of a multicomponent mixture which converts compounds produced because of radiation, which generate color changes of the encapsulation compound, at least partially into colorless nonabsorbing compounds.

* * * * *